United States Patent
Yamashita et al.

[11] Patent Number: 5,829,284
[45] Date of Patent: Nov. 3, 1998

[54] HANDLE LOCKING DEVICE

[75] Inventors: Akihiko Yamashita; Yoshifumi Mochizuki, both of Saitama, Japan

[73] Assignee: Honda Giken Kogyo Kabushiki Kaisha, Tokyo, Japan

[21] Appl. No.: 821,853

[22] Filed: Mar. 21, 1997

[30]        Foreign Application Priority Data

Mar. 22, 1996 [JP] Japan .................................. 8-066663

[51] Int. Cl.⁶ .................................................. B60R 25/02
[52] U.S. Cl. ................................ 70/215; 70/416; 70/419; 70/455
[58] Field of Search ........................... 70/183–186, 233, 70/252, 416, 419, 420, 423, 455, 387, 424, 427, 428, 453, 441, 360, 215–217, 223, 188, 189

[56]                References Cited

U.S. PATENT DOCUMENTS

| | | | |
|---|---|---|---|
| 3,877,265 | 4/1975 | Schaumberg | 70/252 |
| 4,036,039 | 7/1977 | Nakanishi | 70/90 |
| 4,052,869 | 10/1977 | Weber | 70/252 |
| 4,981,026 | 1/1991 | Sakuno | 70/186 |
| 5,263,348 | 11/1993 | Wittwer | 70/379 R |
| 5,265,453 | 11/1993 | Konii | 70/379 R |
| 5,410,898 | 5/1995 | Shieh | 70/276 |
| 5,640,864 | 6/1997 | Miyamoto | 70/379 R |

FOREIGN PATENT DOCUMENTS 55-36678  8/1980  Japan .

*Primary Examiner*—Steven N. Meyers
*Assistant Examiner*—Gary Estremsky
*Attorney, Agent, or Firm*—Birch, Stewart, Kolasch & Birch, LLP

[57]                ABSTRACT

A protector block is constructed so as to be urged in a key extracting direction and movable in a key inserting direction and is provided with radially outwardly projecting engaging portions which come into engagement with an outer lock cylinder when the protector block is pushed in. The overall length in the key inserting direction of the protector block can be shortened and hence it is possible to construct a handle locking device in a compact shape. Further, in the case where the protector block is fabricated by sintering, the green compact density in powder molding can be made more uniform because it is possible to shorten the length in the key inserting direction.

18 Claims, 8 Drawing Sheets

Fig. 10(a)
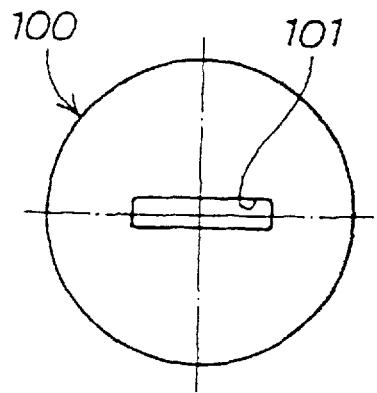
Fig. 10(b)
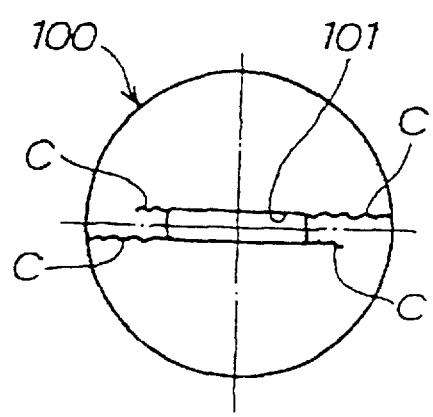
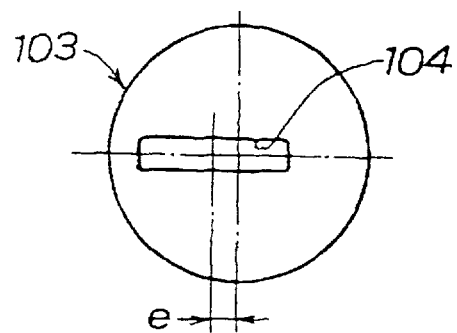
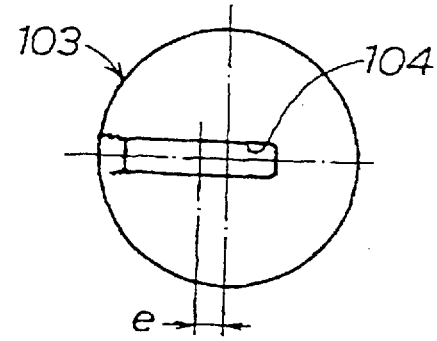
Fig. 11(a)
Fig. 11(b)

HANDLE LOCKING DEVICE

BACKGROUND OF THE INVENTION

1. Field of the Invention

The present invention relates to a handle locking device for a two-wheeled motor vehicle.

2. Description of Background Art

Heretofore, as a locking device for a handle or the like there has been known, for example, "A Lock Reinforcing Device for a Cylinder Lock" which is disclosed in Japanese Utility Model Publication No. 36678/80.

In the above publication, as shown in FIG. 2, a projection is formed on an inner cylinder of a cylinder lock, while in the inner periphery of an outer cylinder includes a recess for locking the projection therein. The inner cylinder is urged outwardly by means of a spring to maintain both the outer and the inner cylinders in a locked state.

In the event a different key is inserted into the inner cylinder, the inner cylinder tries to turn, but this motion is resisted by the engagement of the projection formed on the inner cylinder with the recess formed in the outer cylinder in addition to the disk tumbler-outer cylinder engagement.

The following is an explanation of an unlocking act (stealing act) against a conventional locking device.

FIGS. 10(a) and 10(b) are plan views of a conventional large-sized protector block, wherein FIG. 10(b) shows a state after breakage.

In FIG. 10(a), a protector block 100 of a handle locking device has a keyhole 101 which is formed in a central location.

FIG. 10(b) shows a broken state in which cracks C are developed from corner portions of the keyhole 101 as a result of the insertion of an irregular tool (not shown) such as a screw-driver into the keyhole 101 and the application of an excessive impact load with a hammer or the like.

FIGS. 11(a) and 11(b) are plan views of a conventional small-sized protector block, FIG. 11(b) shows a state after breakage.

In FIG. 11(a), a protector block 103 has a keyhole 104 which is offset by a distance "e" from the center.

The reason why the keyhole 104 is offset is that a small-sized locking device is limited in its space for mounting a tumbler mechanism.

In FIG. 11(b), in the event an irregular tool (not shown) such as a screw-driver or the like is inserted into the keyhole 104 and an excessive impact load is applied to the keyhole, it is possible that cracks will be developed from the corner portions of the keyhole 104 which is offset to the outer periphery and thus breakage will result.

Also in the conventional locking device disclosed in the foregoing publication, the inner cylinder is prevented from being rotated forcibly with a tool or the like other than a regular key. As for the case where a key different from the regular key, is inserted into the inner cylinder and is turned in the unlocking direction, there is recognized an improvement, but as to the case where a different key is turned while being pushed forcibly in the key inserting direction, disk tumblers alone act to resist the rotation as in the Conventional like devices known prior to the foregoing publication.

Reference has been made above to the case where the lock was fastened by the key. When the rider forgets to fasten the lock, disk tumblers alone act to resist rotation in the event a different key is turned while being pushed forcibly in the key inserting direction.

As to the physical strength against breakage of a locking device caused by insertion of an irregular tool or the like into a key insertion hole and application of an excessive impact load, there is a limit. Therefore, a further improvement has been desired from the standpoint of theft prevention.

SUMMARY AND OBJECTIONS OF THE INVENTION

It is an object of the present invention to provide a handle locking device which is difficult to turn even in the event someone inserts an irregular substitute for the regular key into the locking device and tries to turn the substitute to a LOCK position and an OFF position and which is difficult to break even with an excessive impact load imposed thereon by the inserted irregular substitute and hence difficult to be unlocked.

According to the present invention, in order to achieve the above-mentioned object, a protector block is constructed so as to be urged in a key extracting direction and movable in a key inserting direction and is provided with a radially outwardly projecting engaging portion which comes into engagement with an outer lock cylinder whenever the protector block is pushed in.

The overall length in the key inserting direction of the protector block can be shortened, thus permitting a compact construction of the handle locking device. In the case where the protector block is fabricated by sintering, a green compact density in powder molding can be made more uniform.

According to the present invention, a protector block is constructed so as to be urged in a key extracting direction and movable in a key inserting direction and, when pushed in at the OFF position of the key, comes into engagement with an outer lock cylinder. Not only is the protector block moved in the LOCK position but also in the OFF position of the key, even if someone pushes in a different key and tries to forcibly turn the key, it is difficult to do so because of engagement of the outer cylinder with the protector block and engagement of the outer cylinder with tumblers.

According to the present invention, at least one engaging portion is provided on an extension line extending in a longitudinal direction of a keyhole formed in the protector block.

Even if an irregular tool or the like, such as a screw-driver, is inserted into the keyhole of the protector block and a shock is applied to the keyhole, the protector block is difficult to break.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10(a) is a plan view of a conventional large-sized protector block; and FIG. 10(b) is a plan view, of a conventional large-sized protector block; and FIG. 11(a) is a plan view of a conventional small-sized protector block. FIG. 11(b) is a plan view of a conventional small-sized protector block.

DETAILED DESCRIPTION OF THE PREFERRED EMBODIMENTS

Hereinafter, a preferred embodiment of the present invention will be described with reference to the drawings.

Figure 1:
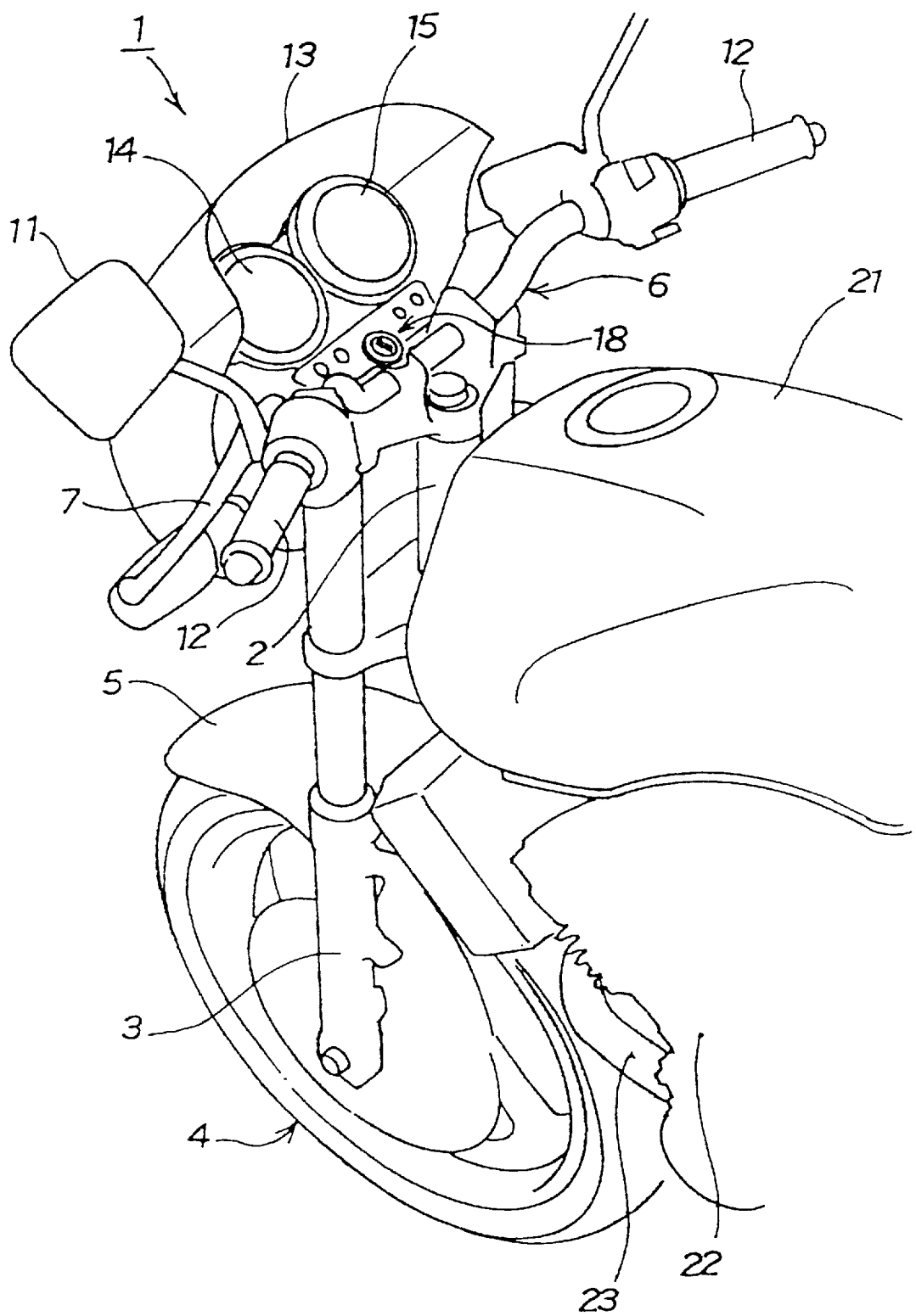
FIG. 1 is a perspective view of a front portion of a two-wheeled motor vehicle equipped with a handle locking device embodying the present invention.

FIG. 1 is a perspective view of a front portion of a two-wheeled motor vehicle equipped with a handle locking device embodying the present invention. The two-wheeled motor vehicle 1, is provided with a steering head 2 attached to the front portion of a frame (not shown). A front fork 3 is mounted to the steering head 2 and is swingable through a handle post (not shown). A front tire 4 includes a wheel connected to an end portion of the front fork 3. A front fender 5 covers the upper portion of the front tire 4. A handle 6 is provided for swinging the front fork 3 in an integral manner. Clutch levers 7 are attached to the right and left portions of the handle 6. A front brake lever (not shown) is provided together with back mirrors 11,11 (the right-hand one is not shown), grips 12,12 mounted on the right and left ends of the handle 6, and components mounted to the front portion of the steering head 2. The components are arranged in order from front to rear as follows, a windshield 13, a speedometer 14 and a tachometer 15, and a main switch 18 equipped with the handle locking device indicated at 16 (see FIG. 3), as well as a fuel tank 21 mounted on the frame behind the steering head 2, an engine 22 is mounted on the frame under the fuel tank 21, and an exhaust pipe 23 extends out of the front portion of the engine 22.

Figure 2:
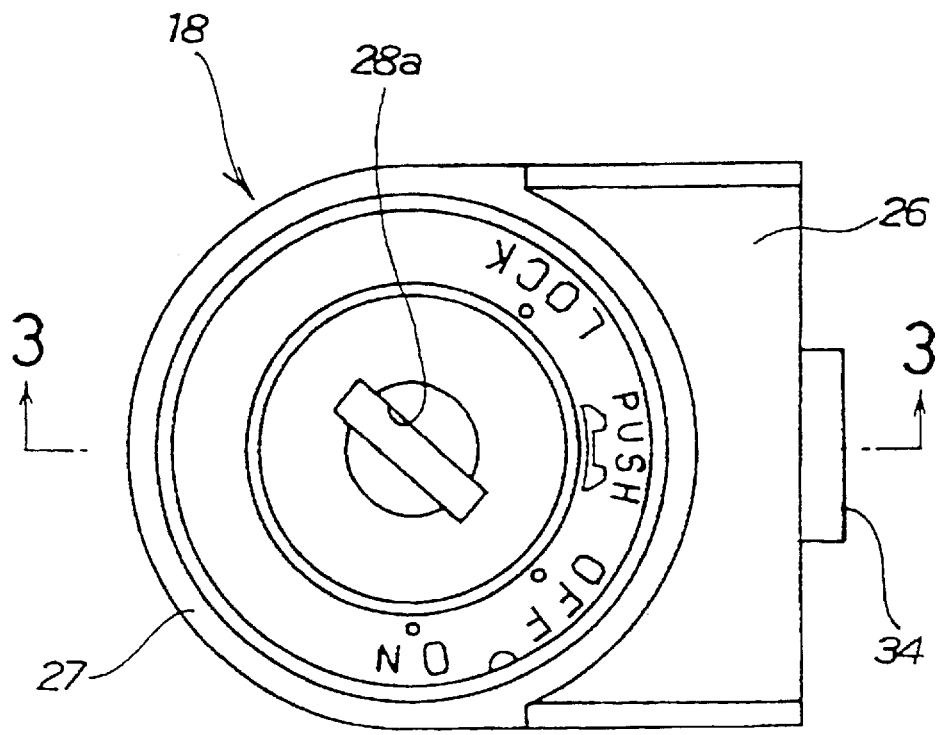
FIG. 2 is a plan view of a main switch equipped with the handle locking device.

FIG. 2 is a plan view of the main switch equipped with the handle locking device embodying the invention. The main switch 18 has on the upper surface thereof a key hole 28a and the indications OFF, ON, PUSH and LOCK which represent turning positions of a key K (see FIG. 3).

When the key is in the OFF position, the engine is at rest and the handle is in an unlocked state. In this position it is possible to insert the key into the key hole.

When the key is turned to the ON position, it becomes possible for the engine to start operation. Now, the starter switch is turned on to start the engine. Of course, the handle is in an unlocked state.

For locking the handle, first in FIG. 1, the handle 6 is turned fully to the right or left, then in this state the key K in the main switch 18 is pushed in at the OFF position and is turned counterclockwise up to the LOCK position in FIG. 2. At the LOCK position, the key K returns to its original upper position by virtue of an urging force acting from below to complete the locking of the handle. At the LOCK position it is possible to pull out the key K.

Figure 3:
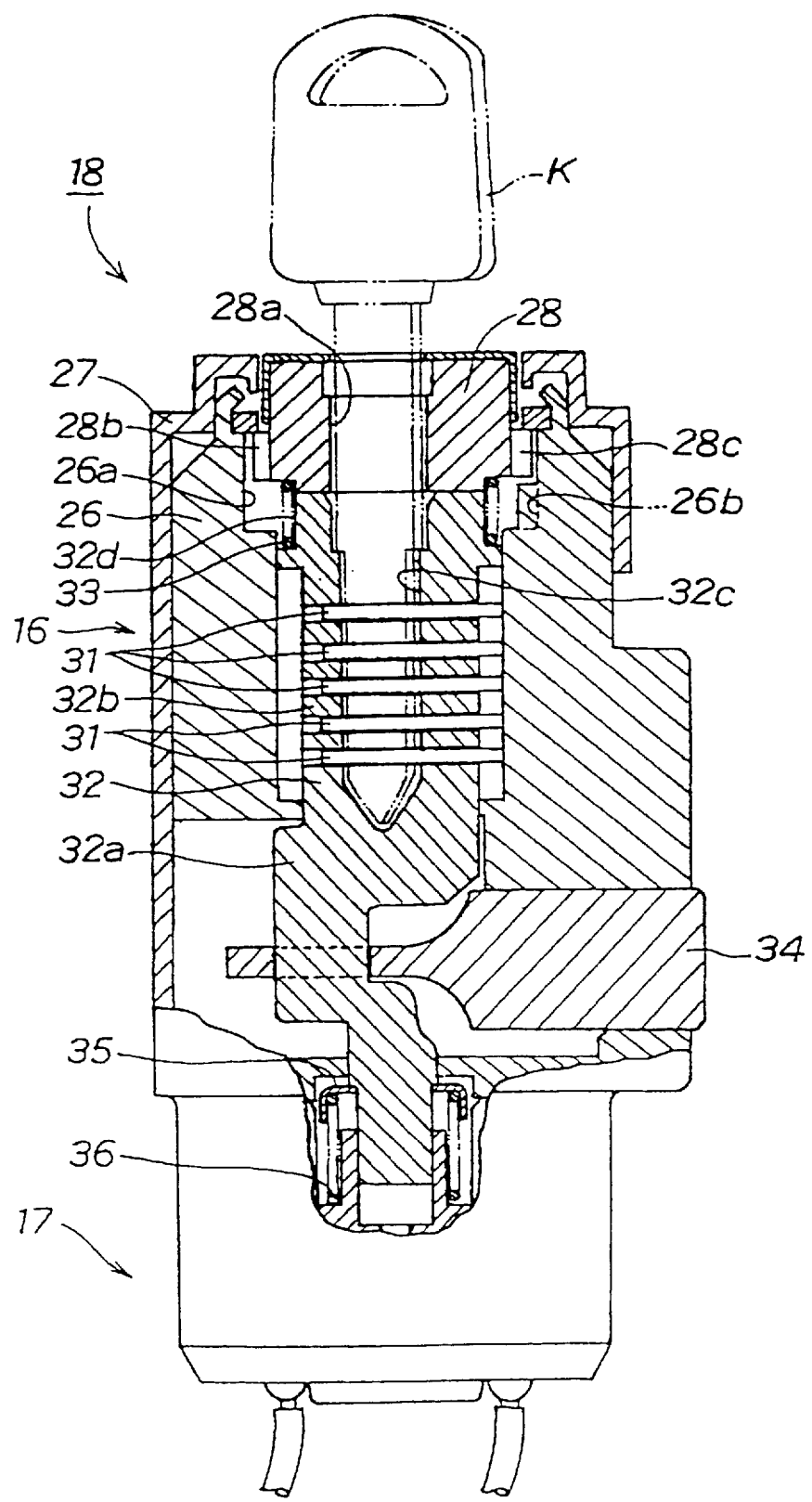
FIG. 3 is a sectional view taken on line 3-3 in FIG. 2.

FIG. 3 is a sectional view taken on line 3—3 in FIG. 2, showing a state in which the key is in the OFF position.

The main switch 18 comprises the handle locking device 16 which constitutes an upper portion and an ignition switch portion 17 which constitutes a lower portion.

The handle locking device 16 comprises an outer lock cylinder 26 attached to the vehicle body, a cover 27 which covers the outer lock cylinder 26, a protector block 28 received in the upper portion of the outer lock cylinder 26 which is rotatable and vertically movable. The protector block 28 includes a keyhole 28a, a crank shaft 32 received in the outer lock cylinder 26 at a position under the protector block 28 which is rotatable and vertically movable. The crank shaft 32 includes tumblers 31 . . . (the dots stand for a plurality and this applies also in the following description) which are pulled into a straight portion 32b upon insertion of the key K into a key insertion hole 32c formed in the straight portion 32b. The straight portion 32b is positioned above a crank portion 32a. A coiled spring 33 urges the protector block 28 upwardly. The coiled spring 33 is disposed in a stepped portion 32d formed in the upper portion of the crank shaft 32, a lock pin 34 is brought into a locked state or an unlocked state by the crank portion 32a of the crank shaft 32. A coiled spring 36 urges the crank shaft 32 upwardly through a retainer 35.

The protector block 28 is radially outwardly formed with a large convex portion 28b and small convex portions 28c . . . for engagement with a large concave portion 26a and small concave portions 26b . . . formed in the outer lock cylinder 26.

Figure 4:
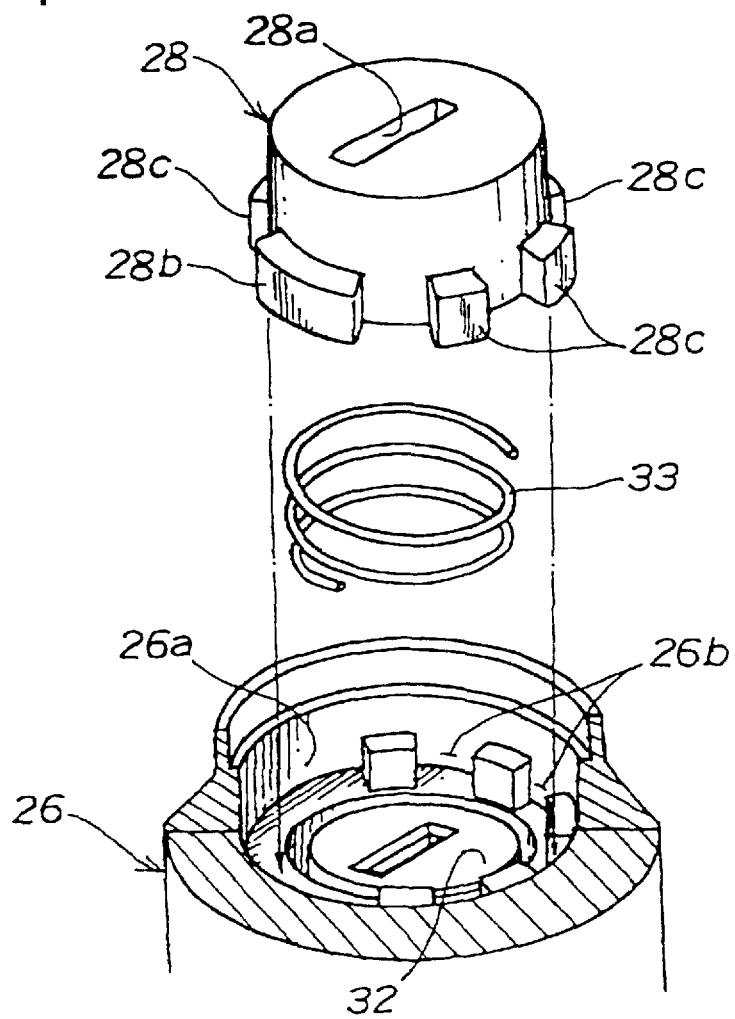
FIG. 4 is an exploded perspective view of a protector block used in the handle locking device.

FIG. 4 is an exploded perspective view of the protector block 28, showing a positional relation between engaging portions of the protector block and the outer lock cylinder.

The protector block 28 has the large convex portion 28b and small convex portions 28c . . . projecting radially outwardly from the lower portion of its outer periphery.

The outer lock cylinder has the large concave portion 26a and small concave portions 26b . . . formed in its inner periphery. The large convex portion 28b of the protector block 28 comes into engagement with the large concave portion 26a of the outer lock cylinder 26, and the small convex portions 28c of the protector block 28 engage the small concave portions 26b . . . of the outer lock cylinder.

Figure 5:
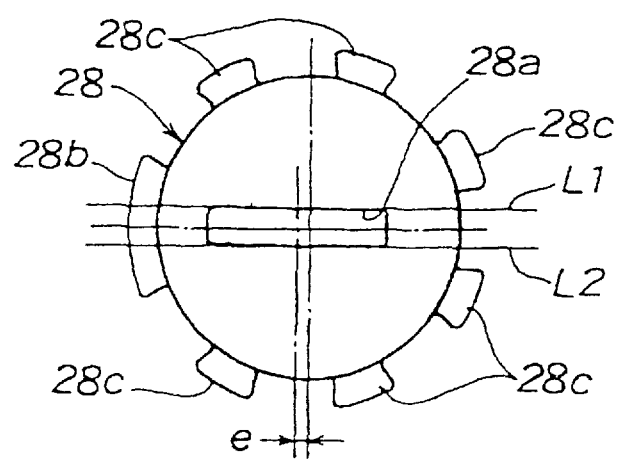
FIG. 5 is a plan view of the protector block.

FIG. 5 is a plan view of the protector block 28.

The large convex portion 28b of the protector block is formed on extension lines L1 and L2 extending in a longitudinal direction of the keyhole 28a and on an offset side by "e" from the center.

By providing the large convex portion 28b, the distance from the keyhole 28a to the outer periphery of the protector block 28 (outside of the large convex portion 28b) becomes longer and the sectional area becomes larger, so that the strength of the protector block increases. For example, therefore, even if someone inserts an irregular tool or the like such as a screwdriver into the keyhole 28a and tries to break the protector block 28 by giving a shock thereto, the protector block is difficult to break and hence it is difficult to steal the vehicle.

The operation of the handle locking device constructed above will be described below.

Figure 6A:
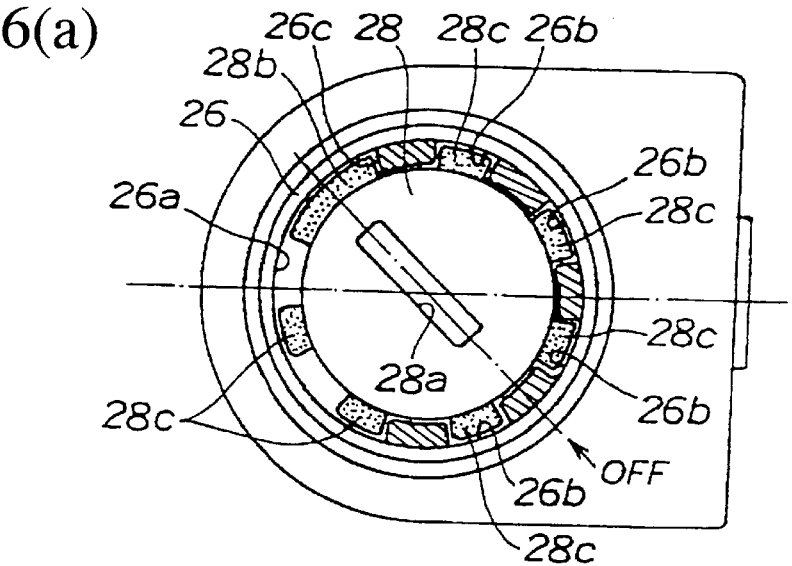
FIG. 6(a) is a diagram showing the operation of the handle locking device (OFF position of a key)
Figure 6B:
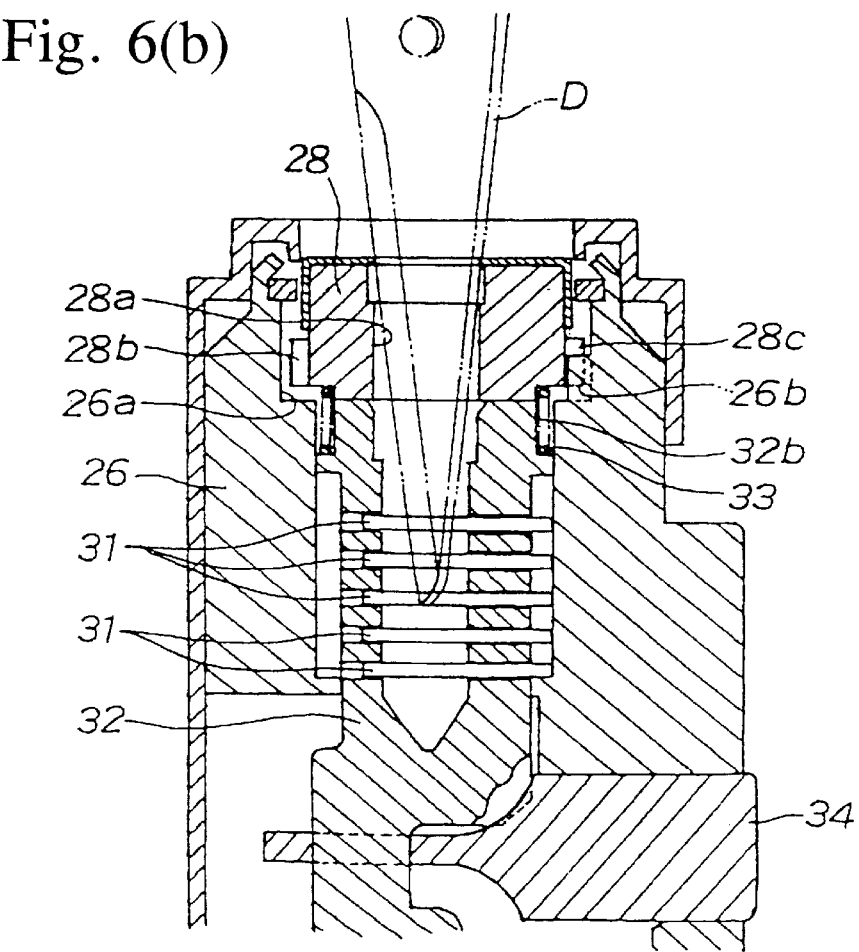
FIG. 6(b) is a diagram showing the operation of the handle locking device (OFF position of the key)

FIGS. 6(a) and 6(b) illustrate the operation of the handle locking device (OFF position of the key), in which FIG. 6(a) is an explanatory view showing in the state where the protector block and the outer lock cylinder are engaged with each other when the protector block is pushed in, and FIG. 6(b) is a sectional view showing the engaged state.

In FIG. 6(a), at the OFF position of the key, the large convex portion 28b of the protector block 28 is received in the large concave portion 26a of the outer lock cylinder and is in proximity to a clockwise turning end 26c of the large concave portion 26a. Two small convex portions 28c,28c are also received in the large concave portion 26a.

The other small convex portions 28c . . . which are four, of the protector block 28 are received in the small concave portions 26b . . . of the outer lock cylinder 26.

In FIG. 6(b), at the OFF position of the key and when the protector block is not pushed in, the large and small convex portions 28b,28c of the protector block assume their upper positions overlapping the large and small concave portions 26a,26b of the outer lock cylinder 26, as shown in FIG. 3. However, if an irregular tool or the like such scissors is inserted into the keyhole 28a of the protector block 28, the protector block sinks together with the crank shaft 32 which underlies the protector block, as shown in FIG. 6(b), so that the large and small convex portions 28b,28c and the large and small concave portions 26a,26b are respectively engaged with each other. Consequently, even if an attempt is made to turn the inserted tool or the like, the protector block is difficult to break because of a more enhanced strength than in the engagement of outer cylinder 26 and tumblers 31 . . . alone, and thus the prevention of theft can be attained.

Figure 7A:
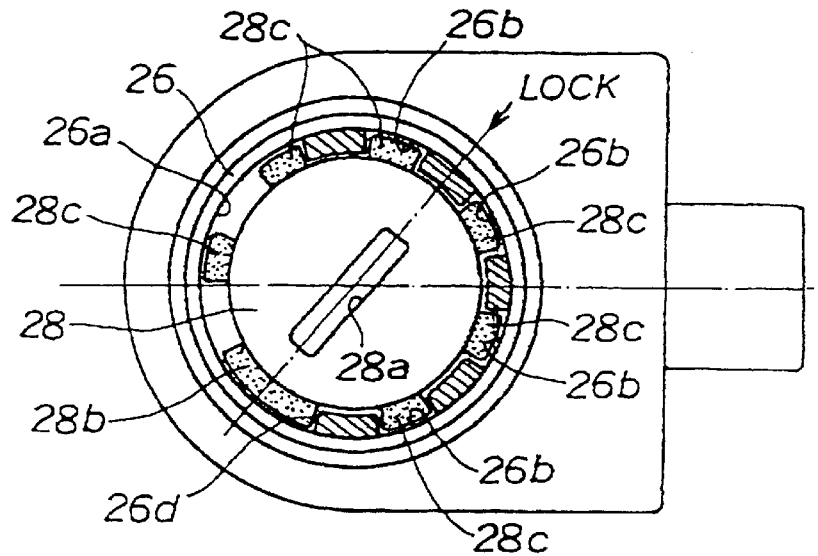
FIG. 7(a) is a diagram showing the operation of the handle locking device (LOCK position of the key)
Figure 7B:
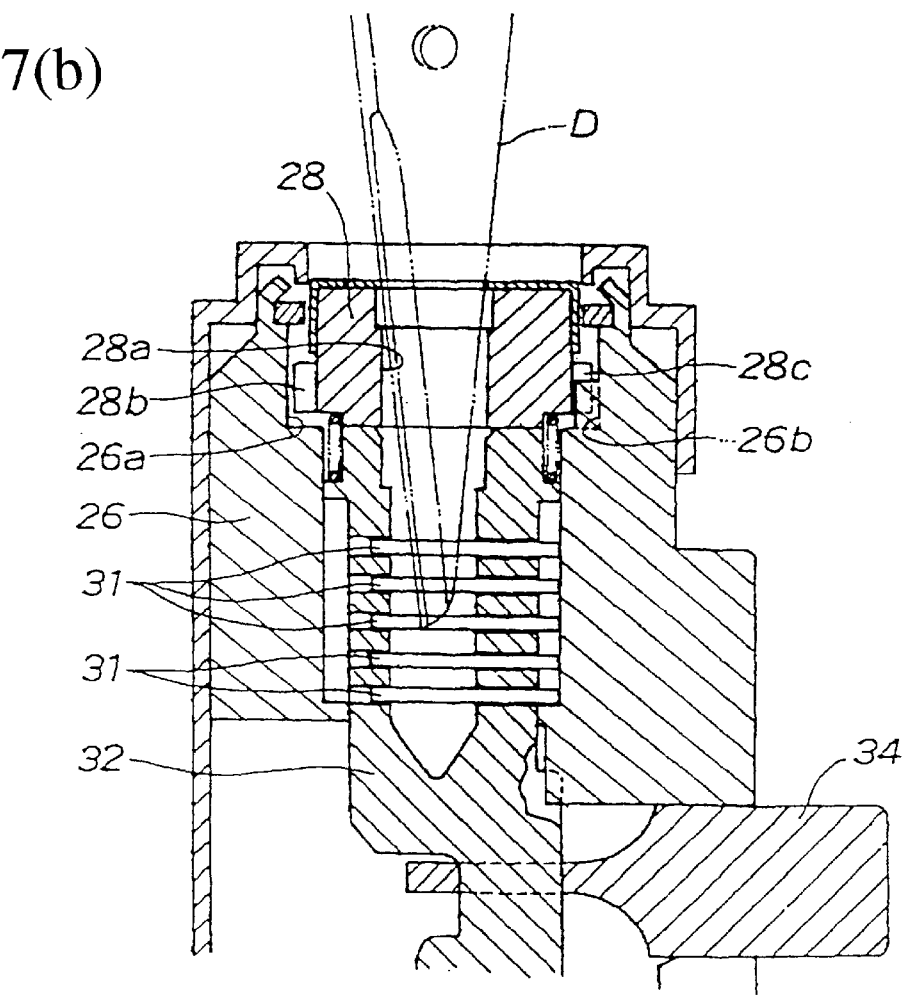
FIG. 7(b) is a diagram showing the operation of the handle locking device (LOCK position of the key)

FIGS. 7(a) and 7(b) illustrate the operation of the handle locking device (LOCK position of the key), in which FIG. 7(a) is an explanatory view showing in what state the protector block and the outer lock cylinder are engaged with each other when the protector block is pushed in, and FIG. 7(b) is a sectional view showing the engaged state.

In FIG. 7(a), at the LOCK position of the key, the large convex portion 28b of the protector block 28 is received in the large concave portion 26a of the outer lock cylinder 26 and is in proximity to a counterclockwise turning end 26d of the large concave portion 26a. Two small convex portions 28c are also received in the large concave portion 26a.

The other four small convex portions 28c . . . of the protector block 28 are received respectively in the small concave portions 26b of the outer lock cylinder 26.

In FIG. 7(b), at the LOCK position of the key and when the protector block 28 is not pushed in, the large and small convex portions 28b,28c of the protector block assume their upper positions overlapping the large and small concave portions 26a,26b of the outer lock cylinder 26, as shown in FIG. 3. However, if an irregular tool or the like such as scissors is inserted into the keyhole 28a of the protector block 28, the protector block sinks together with the crank shaft 32 which underlies the protector block, as shown in FIG. 7(b), resulting in engagement of the large and small convex portions 28b,28c with the large and small concave portions 26a, 26b. Thus, even with a forced turn of the inserted irregular tool or the like, a more increased strength than in the engagement of outer cylinder and tumblers 31 alone makes the breakage of the protector block difficult.

Thus, since the protector block 28 is provided with the large convex portion 28b and small convex portions 28c . . . and the outer lock cylinder 26 is provided with the large concave portion 26a and small concave portions 26b not only in the LOCK position of the key K but also in the OFF position of the key as a result of the rider having forgotten to fasten the lock, even if someone inserts an irregular tool or the like D into the keyhole 28a and tries to turn it forcibly, it becomes difficult to turn it due to engagement of the convex portions 28b,28c with the concave portions 26a,26b, whereby the theft of the vehicle can be prevented.

Figure 8:
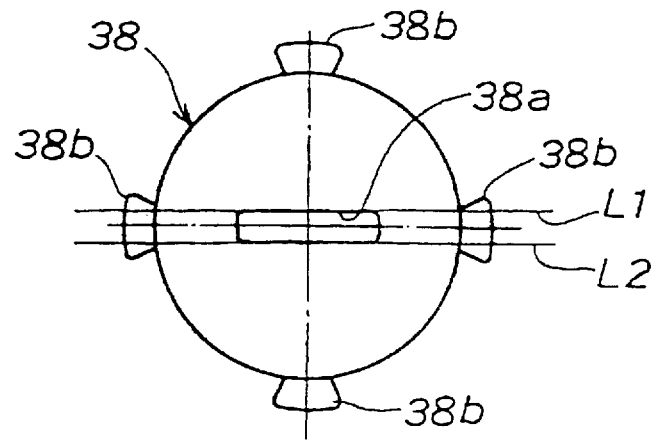
FIG. 8 is a plan view showing a modified example of a protector block according to the present invention.

FIG. 8 is a plan view showing a modified example of a protector block according to the present invention. The protector block, indicated at 38, according to this modification has two convex portions 38b projecting radially outwardly on extension lines L1 and L2 which extend longitudinally of a keyhole 38a formed at the center of the protector block. The protector block 38 also has other convex portions 38b, 38b.

Even if an irregular tool or the like D, see FIG. 6(b), such as a screw-driver is inserted into the keyhole 38a of the protector block 38 and a shock is given to the keyhole, the protector block 38 is strong enough to prevent breakage because the distance between the keyhole 38a and the protector block is long and the sectional area of this portion is large.

Figure 9A:
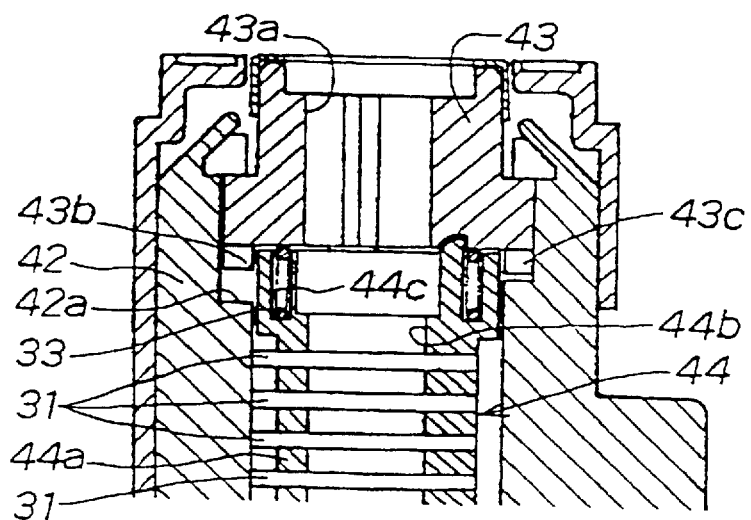
FIG. 9(a) is a diagram explanatory of a handle locking device according to another embodiment of the present invention.
Figure 9B:
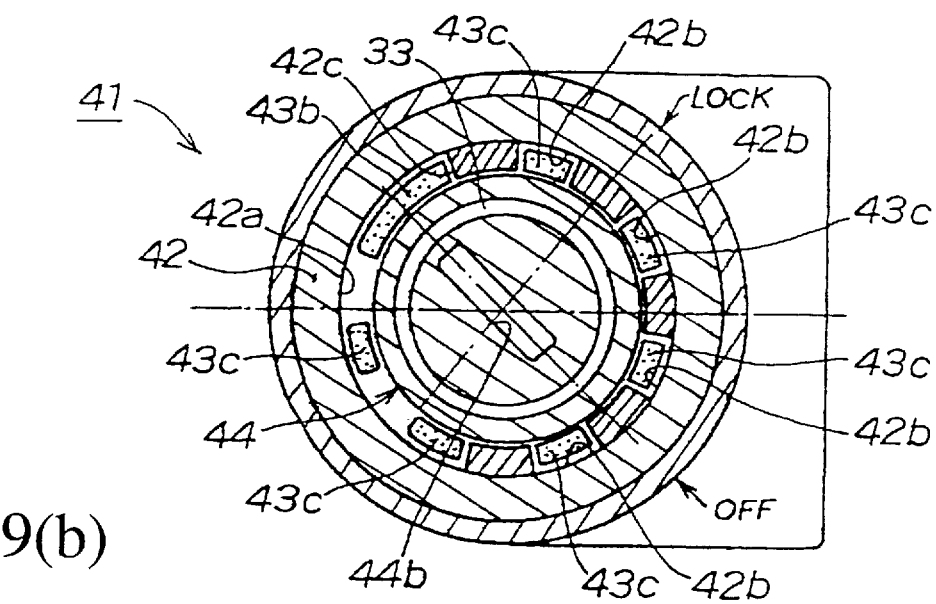
FIG. 9(b) is a diagram explanatory of a handle locking device of the embodiment of the FIG. 9(a)

FIGS. 9(a) and 9(b) illustrate a handle locking device according to another embodiment of the present invention, of which FIG. 9(a) is a sectional view of a principal portion and FIG. 9(b) is a diagram explanatory of an engaging portion of a protector block (at the OFF position of the key). In this embodiment, the portions of the same structures as in the previous embodiment are indicated by the same reference numerals and explanations thereof will be omitted.

In FIG. 9(a), a handle locking device 41 comprises an outer lock cylinder 42 attached to the vehicle body, a protector block 43 received in the upper portion of the outer lock cylinder 42 which is rotatably and vertically movable, the protector block 43 having a keyhole 43a, and a crank shaft 44 received in the outer lock cylinder 42 at a position under the protector block 43 which is rotatably and vertically movable. The crank shaft 44 includes tumblers 31 . . . which are pulled into a straight portion 44a upon insertion of the key into a key insertion hole 44b formed in the straight portion 44a. An annular groove 44c receives a coiled spring 33 therein.

The protector block 43 has a large convex portion 43b and small convex portions 43c . . . extending in the key inserting direction. The large and small convex portions 43b and 43c are formed on the outer periphery side of the lower surface of the protector block 43.

The outer lock cylinder 42 has a large concave portion 42a formed in the inner periphery thereof.

In FIG. 9(b), the outer lock cylinder 42 has small concave portions 42b . . . formed in the inner periphery thereof. In the OFF position of the key, the large and small convex portions 43b, 43c of the protector block 43, see FIG. 9 (a), are positioned, respectively, above the large and small concave portions 42a,42b of the outer lock cylinder 42. When the protector block 43 sinks, the large convex portion 43b is received in the large concave portion 42a of the outer lock cylinder 42 and is in proximity to a clockwise turning end 42c of the large concave portion 42a. Two small convex portions 43c,43c are also received in the large concave portion 42a.

Four small convex portions 43c . . . of the protector block 43 are respectively received in the small concave portions 42b . . . .

Thus, since the protector block 43 shown in FIG. 9(*a*) has the large and small convex portions 43*b*,43*c* extending in the key inserting direction, even if an irregular substitute for the key is inserted into the keyhole 43*a* at the OFF position of the key and forced to turn while being pushed, it cannot be turned, so that it is difficult to release the locked state, coupled with the prevention of rotation of the crank shaft by the tumblers 31. Though not shown, also when the key is pushed in the LOCK position, the large and small convex portions 43*b*,43*c* come into engagement with the large and small concave portions 42*a*, 42*b* at a position of about a 90° turn counterclockwise from the OFF position of the key to prevent rotation of the protector block 43 and crank shaft 44.

With regard to the convex portions 28*b*,28*c*,38*b*,43*b* and 43*c* of the protector blocks 28,38 and 43 shown in Figs.6(*b*), 8 and 9(*a*), their shape and number are not limited to those shown in the above embodiments insofar as the convex portions are engaged with the concave portions of the outer lock cylinder when the protector block is pushed in at the OFF or LOCK position.

Further, the handle locking device of the present invention is applicable not only to the two-wheeled motor vehicle referred to in the above embodiments but also to other vehicles such as three-wheeled and four-wheeled motor vehicles, electric cars and service cars.

The above-described constructions of the present invention bring about the following effects.

According to the handle locking device, of the present invention, since the protector block is constructed so as to be urged in the key extracting direction and movable in the key inserting direction and is provided with a radially outwardly projecting engaging portion which comes into engagement with the outer lock cylinder when the protector block is pushed in, it is possible to shorten the overall length in the key inserting direction of the protector block and hence possible to construct the handle locking device in a compact shape. Further, in the case where the protector block is fabricated by sintering, the green compact density in powder molding can be made more uniform, thus permitting improvement in the quality of the protector block.

According to the handle locking device of the present invention, the protector block is constructed so as to be urged in the key extracting direction and movable in the key inserting direction and, when pushed in at OFF position of the key, comes into engagement with the outer lock cylinder. Therefore, also in the OFF position of the key, like the LOCK position, even if a key substitute is pushed in and tried to be turned forcibly, it is difficult to turn because engagement between the outer lock cylinder and the protector block and engagement between the outer lock cylinder and the tumblers, thus permitting the prevention of theft.

According to the handle locking device of the present invention, since at least one engaging portion is provided on an extension line extending longitudinally of the keyhole formed in the protector block, even if an irregular tool or the like such as a screw-driver is inserted into the keyhole of the protector block and a shock is given to the keyhole, the protector block is difficult to break, whereby the vehicle can be prevented from theft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A handle locking device comprising:

an outer lock cylinder for attaching to a vehicle base;

a crank shaft for insertion and extraction of a locking pin, a straight portion formed on said crank shaft;

a protector block having a keyhole, the protector block being arranged axially spaced in series with said crank shaft, the protector block being mounted for axial movement between outward and inward positions, the outer lock cylinder for receiving said crank shaft and said protector block;

tumblers retractably mounted in said straight portion of the crank shaft, retraction of said tumblers allowing a key insertion hole formed in an end face of said straight portion, the tumblers being retracted by inserting a key which has passed through the protector block into the key insertion hole, thereby permitting rotation of the crank shaft;

means for urging said protector block axially outward; and said protector block having a radially, outwardly projecting, engaging portion for engaging the outer lock cylinder whenever the protector block is moved axially inward.

2. The handle locking device according to claim 1, wherein said crank shaft is disposed adjacent to said protector block and said protector block is displaced by said means for urging to be disposed for initially receiving a key prior to a key being inserted into the key insertion hole.

3. The handle locking device according to claim 1, wherein said protector block includes a plurality of projections and corresponding recesses formed on said outer lock cylinder.

4. The handle locking device according to claim 1, wherein said means for urging is a spring mounted between said protector block and said crank shaft for urging said protector block in a key extracting direction and for permitting movement of said protector block.

5. The handle locking device according to claim 3, wherein one of said projections formed on said protector block is enlarged relative to the remaining projections and one of the recesses formed on said outer lock cylinder is enlarged for receiving said enlarged projection when said protector block is moved towards said crank shaft.

6. The handle locking device according to claim 3, wherein said protector block is prevented from rotation when said projections are disposed within said recesses.

7. The handle locking device according to claim 1, wherein said protector block is fabricated by sintering.

8. The handle locking device according to claim 3, wherein said projections are convex and said recesses are concave.

9. The handle locking device according to claim 1, wherein a plurality of engaging portions are provided and at least one said engaging portions is provided on an extension line extending longitudinally of the keyhole formed in said protector block.

10. A handle locking device comprising:

an outer lock cylinder for attaching to a vehicle base;

a crank shaft for insertion and extraction of a locking pin, said crank shaft includes a straight portion;

a protector block having a keyhole, the protector block being arranged axially spaced in series with said crank shaft, the protector block being mounted for axial movement between outward and inward positions, the outer lock cylinder for receiving said crank shaft and said protector block;

tumblers retractably mounted in said straight portion of the crank shaft, retraction of the tumblers allowing rotation of the crankshaft; and a key insertion hole formed in an end face of said straight portion, the tumblers being retracted by inserting a key which has passed through the protector block into the key insertion hole, thereby permitting rotation of the crank shaft;

means for urging said protector block axially outward, the protector block coming into engagement with the outer lock cylinder when moved axially inward at an OFF position of the key.

11. The handle locking device according to claim 10, wherein said crank shaft is disposed adjacent to said protector block and said protector block is displaced by said means for urging to be disposed for initially receiving a key prior to a key being inserted into the key insertion hole.

12. The handle locking device according to claim 10, wherein said protector block includes a plurality of projections and corresponding recesses formed on said outer lock cylinder.

13. The handle locking device according to claim 10, wherein said means for urging is a spring mounted between said protector block and said crank shaft for urging said protector block in a key extracting direction and for permitting movement of said protector block.

14. The handle locking device according to claim 12, wherein one of said projections formed on said protector block is enlarged relative to the remaining projections and one of the recesses formed on said outer lock cylinder is enlarged for receiving said enlarged projection when said protector block is moved towards said crank shaft.

15. The handle locking device according to claim 12, wherein said protector block is prevented from rotation when said projections are disposed within said recesses.

16. The handle locking device according to claim 10, wherein said protector block is fabricated by sintering.

17. The handle locking device according to claim 12, wherein said projections are convex and said recesses are concave.

18. The handle locking device according to claim 10, wherein a plurality of engaging portions are provided and at least one said engaging portions is provided on an extension line extending longitudinally of the keyhole formed in said protector block.

* * * * *